(12) United States Patent
Hunt

(10) Patent No.: US 8,025,466 B2
(45) Date of Patent: Sep. 27, 2011

(54) REMOVABLE COUNTERSINK BIT

(76) Inventor: Marty D. Hunt, Ocoee, FL (US)

( * ) Notice: Subject to any disclaimer, the term of this patent is extended or adjusted under 35 U.S.C. 154(b) by 794 days.

(21) Appl. No.: 12/152,772

(22) Filed: May 16, 2008

(65) Prior Publication Data

US 2009/0035079 A1 Feb. 5, 2009

Related U.S. Application Data

(60) Provisional application No. 60/930,446, filed on May 16, 2007.

(51) Int. Cl.
*B23B 51/05* (2006.01)

(52) U.S. Cl. ........ 408/1 R; 175/387; 175/403; 408/191; 408/206; 408/224

(58) Field of Classification Search .................. 408/1 R, 408/117, 118, 189–191, 193, 196, 204–209, 408/224–225; 175/403, 405.1, 387; 125/20; 451/541, 543

See application file for complete search history.

(56) References Cited

U.S. PATENT DOCUMENTS

| | | | |
|---|---|---|---|
| 2,140,192 A | 12/1938 | Thatcher | |
| 2,599,770 A | 6/1952 | Marcerou | |
| 3,550,701 A | 12/1970 | Holley | |
| 3,575,520 A * | 4/1971 | Halpern | 408/191 |
| 3,672,785 A | 6/1972 | Byrne | |
| 3,778,179 A | 12/1973 | Rivas | |
| 3,848,687 A | 11/1974 | Funakubo | |
| 4,027,992 A | 6/1977 | Mackey, Sr. et al. | |
| 4,332,299 A | 6/1982 | Parks et al. | |
| 4,458,949 A | 7/1984 | Jury | |
| 4,533,285 A * | 8/1985 | Jorgensen | 408/191 |
| 4,551,045 A | 11/1985 | Bossler | |
| 4,645,390 A | 2/1987 | Pecha et al. | |
| 4,924,951 A | 5/1990 | Paulson | |
| 4,968,101 A | 11/1990 | Bossow | |
| 5,071,295 A * | 12/1991 | Greig | 279/156 |
| 5,211,635 A * | 5/1993 | Omi et al. | 408/224 |
| 5,470,131 A | 11/1995 | Nolan et al. | |
| 5,522,646 A | 6/1996 | Friedman et al. | |
| 5,755,048 A | 5/1998 | Lee | |
| 6,368,031 B1 | 4/2002 | Martinek et al. | |
| 6,893,194 B2 * | 5/2005 | Jones et al. | 408/204 |
| 6,907,874 B1 | 6/2005 | Faircloth | |
| 7,101,124 B2 | 9/2006 | Keightley | |
| 7,141,074 B2 | 11/2006 | Fanger et al. | |
| 7,384,222 B2 * | 6/2008 | Chao | 408/206 |
| 2003/0026667 A1 | 2/2003 | Schmid | |
| 2003/0107258 A1 | 6/2003 | Katsumoto | |
| 2003/0133765 A1 | 7/2003 | Capriotti | |

FOREIGN PATENT DOCUMENTS

| | | | |
|---|---|---|---|
| EP | 458047 A1 * | 11/1991 | |
| EP | 1002606 A1 * | 5/2000 | |
| GB | 2144591 A * | 3/1985 | |
| GB | 2364662 A * | 2/2002 | |
| JP | 52014287 A * | 2/1977 | |
| JP | 10006117 A * | 1/1998 | |
| JP | 2005238344 A * | 9/2005 | |

* cited by examiner

*Primary Examiner* — Daniel W Howell
(74) *Attorney, Agent, or Firm* — Akerman Senterfitt

(57) ABSTRACT

A removable countersink bit comprises a body, a flange, at least one clamp, and a plurality of cutting teeth. The removable countersink bit creates countersink holes for receiving manhole fixtures and the like.

19 Claims, 6 Drawing Sheets

REMOVABLE COUNTERSINK BIT

FIELD OF THE INVENTION

The invention relates in general to countersink drilling bits, and more particularly to removable drilling bits for creating countersink holes.

BACKGROUND OF THE INVENTION

Man holes, utility holes, maintenance holes, access chambers and the like are often used to provide access to certain areas, including wells, sewers and the like. In well or access hole drilling, safety dictates that it is important to affix a removable cover to a newly drilled hole to prevent accidental exposure, while still allowing intentional access, to the well. In general, removable covers include manhole fixtures comprising a manhole cover received in a manhole cover frame wherein the surface of the cover is substantially flush with the surface of the substrate in which the manhole fixture is installed. Installing the manhole fixture in a position substantially flush with the substrate serves to provide a safer environment for traversing areas where holes are drilled.

To facilitate a safe environment around drilled holes, such as wells, removable manhole fixtures are frequently cast in concrete footings so as to provide ample support for the manhole cover frame and removable cover. The drawbacks to this prior art technique lies in the fact that contact with the manhole fixture must be avoided for a lengthy period of time in order for proper setting of the manhole fixture in the substrate to occur.

With manhole covers installed in areas of high traffic, such as, parking lots, such installations can lead to increased financial burden. For the business wherein the manhole fixture is being installed, costs can come by way of decreased business traffic as well as potential insurance claims for injuries sustained from premature contact with the manhole cover. For the installer, increased personnel costs come as a result of physically monitoring the manhole fixture as the adhesive or bonding agent sets in an effort to avoid improper contact or injury.

An alternative method of installing manhole fixtures including using bits having diameters greater than the well hole to create enlarged holes with diameters larger than the diameter of the manhole fixture thereby allowing for the manhole fixture to be placed into and cemented in place using an adhesive or other means such as masonry mortar. Depending on the adhesive used to set the manhole fixture, setting time can vary between hours and days. Additional drawbacks to this prior art procedure include properly centering the bit for countersink hole placement as well as the potential introduction of excess amounts of drilled material into the previously drilled hole. When holes are drilled for wells, the introduction of drilled material into the well can alter the pH of the well contents.

The invention described herein resolves this issue by creating a countersink hole in a size and shape substantially similar to the manhole fixture wherein the manhole fixture can readily be set into the countersink hole and the manhole cover used immediately thereafter. The immediate use of the manhole cover frees up a significant amount of time generally associated with waiting for the proper setting of the manhole fixture in its respective footing. An additional benefit comes by way of reducing the overall amount of masonry dust introduced into the well and possibly changing the pH of the well or the makeup of the contents therein.

SUMMARY OF THE INVENTION

Aspects of the invention include a countersink bit comprising a substantially cylindrical body having a first end, a second opposite end and at least one longitudinal split traversing the body between said ends. At least one clamp attached to the body at the split and a flange attached to one end of the body. The flange comprises at least one cutter.

The countersink bit can further include a second opposite split traversing the body between the ends at a position substantially opposite the longitudinal split. The second split can comprise at least one hinge.

The countersink bit can further comprise a plurality of cutters wherein the cutters are affixed to cutting plates removably attached to the flange. The cutters can comprise diamond material.

The countersink bit can include clamps, such as, cam clamps, ring clamps, band clamps and toggle latches. Aspects of the invention contemplate that the countersink bit can be made from a material comprising metal. then invention can further comprise an inner surface having interlocking channels for receiving opposite interlocking channels on a primary bit or an inner surface having a channel for receiving a key to prevent countersink bit slippage on a primary bit.

According to additional aspects of the present invention, the removable masonry countersink bit can comprise a substantially cylindrical body having a first end and a second opposite end, wherein the body is defined by two halves further comprising a first split traversing the body between the ends and a second split traversing the body between the ends substantially opposite the first split. At least one clamp can be attached to the body at the first split for connecting each of the halves. At least one hinge can be disposed at the second split and connected to each of said halves. A flange can be attached to one end of the body comprising at least one cutter.

Aspects of the present intention also contemplate a method of drilling a countersink hole including attaching a countersink bit to a primary bit wherein said countersink bit comprises a substantially cylindrical body, at least one longitudinal split traversing the body, at least one clamp attached to the body at the split; and a flange attached to one end of the body, the flange comprising at least one cutter. Drilling a primary hole with the primary bit. Advancing the countersink bit to the substrate and rotating the countersink bit about the primary hole thereby causing said countersink bit to drill a countersink hole in the substrate. The countersink bit can be rotated until a countersink hole is created having a depth substantially similar to the thickness of a man hole fixture. The countersink bit can then be removed from the primary bit without removing said primary bit from said primary hole.

DETAILED DESCRIPTION OF THE PREFERRED EMBODIMENT

Figure 1:
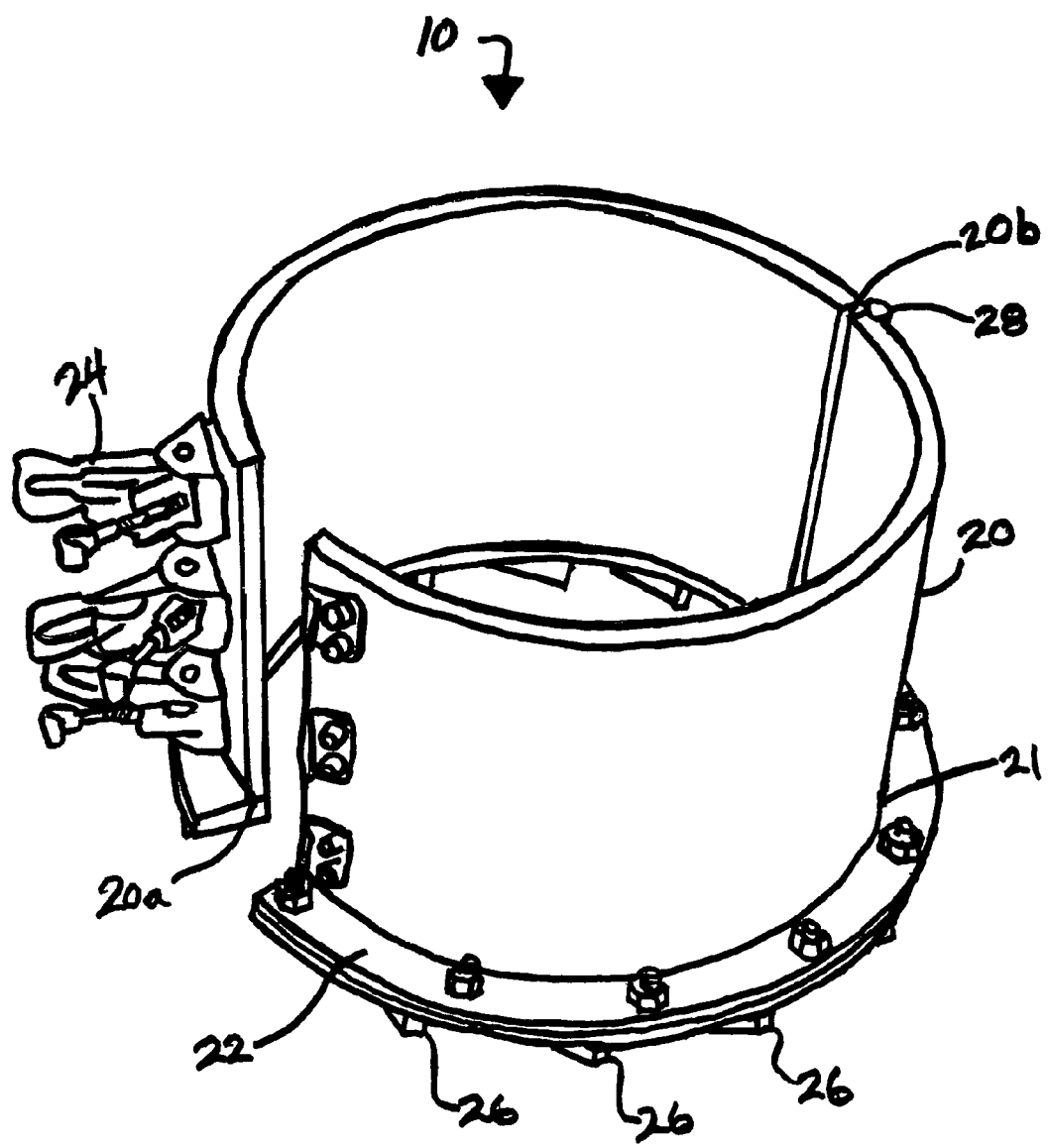
FIG. 1 is a perspective view of a primary comprising a traditional core bit according to aspects of the present invention.

Referring now to FIG. 1, an exemplary removable countersink bit according to aspects of the present invention is illustrated and generally referred to by reference numeral 10.

The removable countersink bit 10 can comprise a body 20, a flange 22, at least one clamp 24, and at least one cutter 26. As depicted in FIG. 1, the body 20 can further comprise at least one hinge 28 juxtaposed to the clamps to facilitate the removal and application of the removable countersink bit 10 to and from a primary bit 80 such as, for example a core bit for well drilling.

The body 20 is generally cylindrical in shape and comprises a flange 22 disposed about the base 21 of the body 20. The body 20 can comprise a rigid or semi rigid material capable of maintaining sufficient strength to maintain the position of the flange 22 while creating a countersink well hole 60. In a preferred embodiment, the body 20 comprises a pair of juxtaposed splits 20a, 20b.

In an alternate embodiment, the body 20 can comprise a single split (not shown) comprised of material with sufficient flexibility and strength to create a split of sufficient size to receive a primary bit 80. In such an embodiment, only a clamp 24 or other clamping means (not shown) is used to close or reduce the space in the split in the body 20 thereby causing sufficient friction between the countersink bit 10 and primary bit 80 to maintain the position of the removable countersink bit 10 on the primary bit 80, no hinges 28 or other hinging means are necessary.

A clamp 24 or clamping means is affixed to a first split 20a in the body 20 and operates to reduce or eliminate the split 20a in the body 20. The clamps 24 are of sufficient strength to maintain the position of the body 20 on the primary bit 80. The clamps 24 or clamping means can comprise cam clamps, ring clamps, band clamp, toggle latches, or any other latch, clamp or clamping means as is known in the art, sufficient to impart the appropriate strength to maintain the position of the removable countersink bit 10 on the primary bit 80.

The body 20b can further comprise at least one hinge 28 or hinge means (not shown) fixedly mounted on a second split 20b in a position generally opposite that of the clamps 24 to facilitate the opening of the body 20 for mounting and removal.

Figure 2:
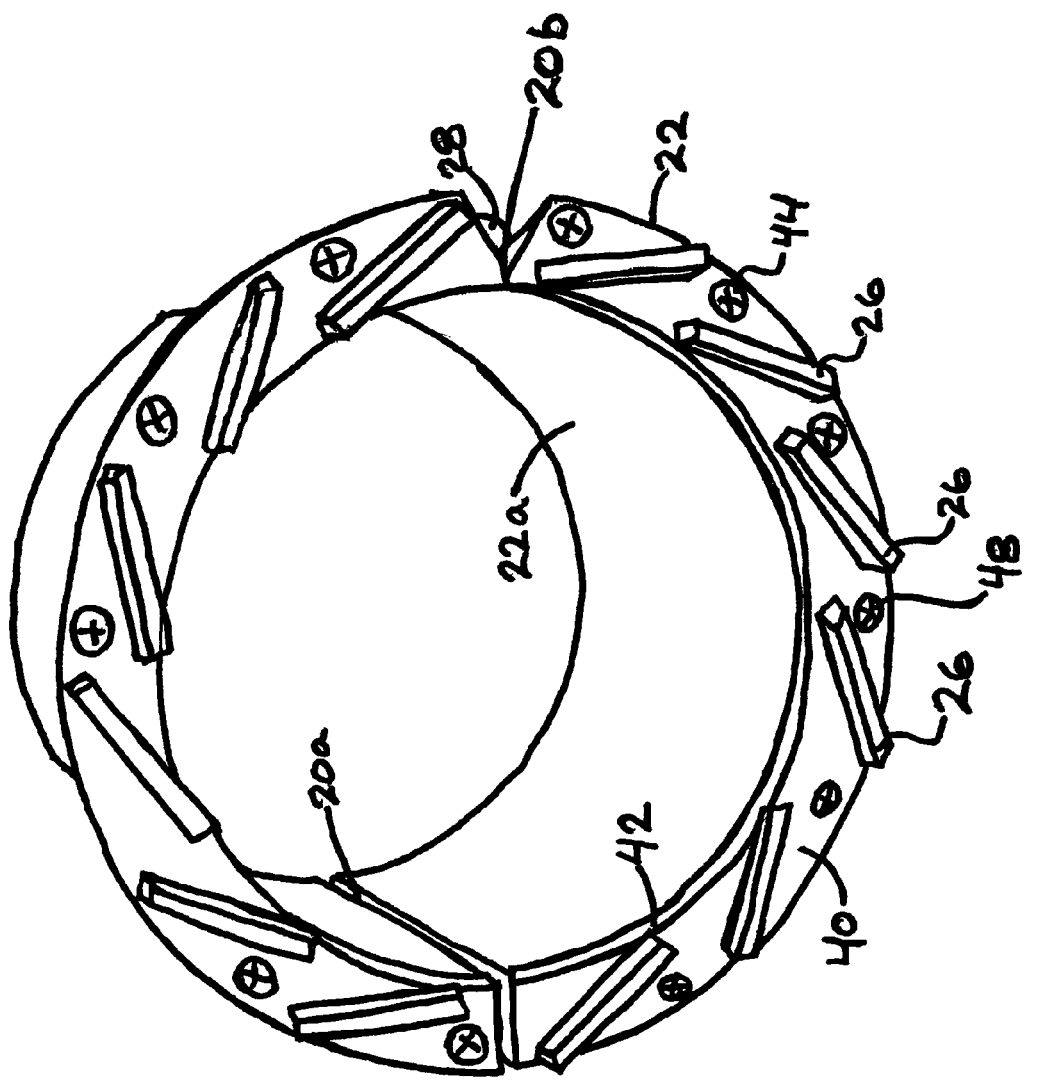
FIG. 2 is a perspective view of the removable countersink bit according to aspects of the present invention.

Referring now to FIG. 2, the flange 22 can be affixed generally perpendicular to the length of and at the base 21 of the body 20 and can comprise a plurality of cutters 26 for creating a counter sink well hole 60. The inner diameter 22a of the flange 22 is substantially similar in size to the inner diameter 23 of the body 20 so as not to impede with the application of the removable countersink bit 10 to the primary bit 80. The flange 22 further comprises a plurality of cutters 26 disposed thereon. The cutters 26 can comprise diamond coated cutting teeth as are well known in the art or teeth manufactured with a material sufficient to cut or grind the respective substrates within which manhole fixtures are installed. The cutters 26 can be radially angled to provide enhanced cutting characteristics. In an alternate embodiment cutters of varying sizes (not shown) can be used to provide enhanced cutting characteristics.

The cutters 26 can be attached directly to the flange 22 or can be attached to a removable cutting plate 40 that can be removably attached to the flange 22. A removable cutting plate 40 can comprise a plurality of cutters 26 attached to a base 42 further comprising a plurality of apertures 44 which are complementary to a plurality of flange apertures 46 disposed about the flange 22. The base apertures 44 and the flange apertures 46 are of sufficient size to receive a bolt 48 or other attachment means (not shown) for removably affixing the cutting plate 40 to the flange 22. The base 42 of the cutting plate 40 is of substantially similar size and shape as that of the flange 22. The bolt aperture 44 and/or the flange aperture 46 can be threaded to avoid the need for a nut 47 to be used with the bolt 48.

Figure 3:
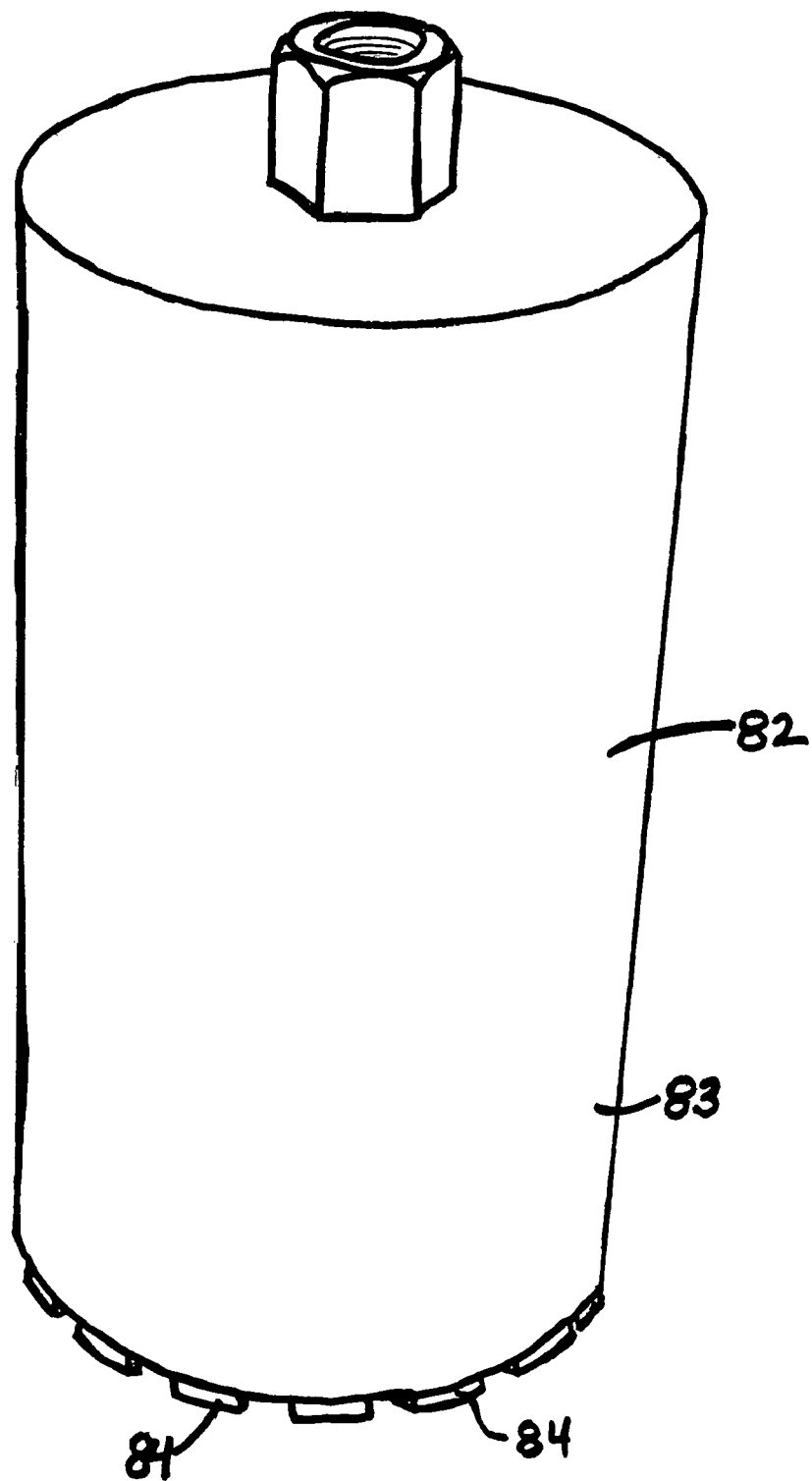
FIG. 3 is a perspective view of the cutting flange of the removable countersink bit according to aspects of the present invention.

Referring next to FIG. 3, a prior art primary bit 80 such as a core bit is shown. The primary bit 80 comprises a cylindrical body 82, a plurality of cutters 84 and a drive connection 86 for receiving the drive shaft of a well drilling apparatus (not shown).

Figure 4:
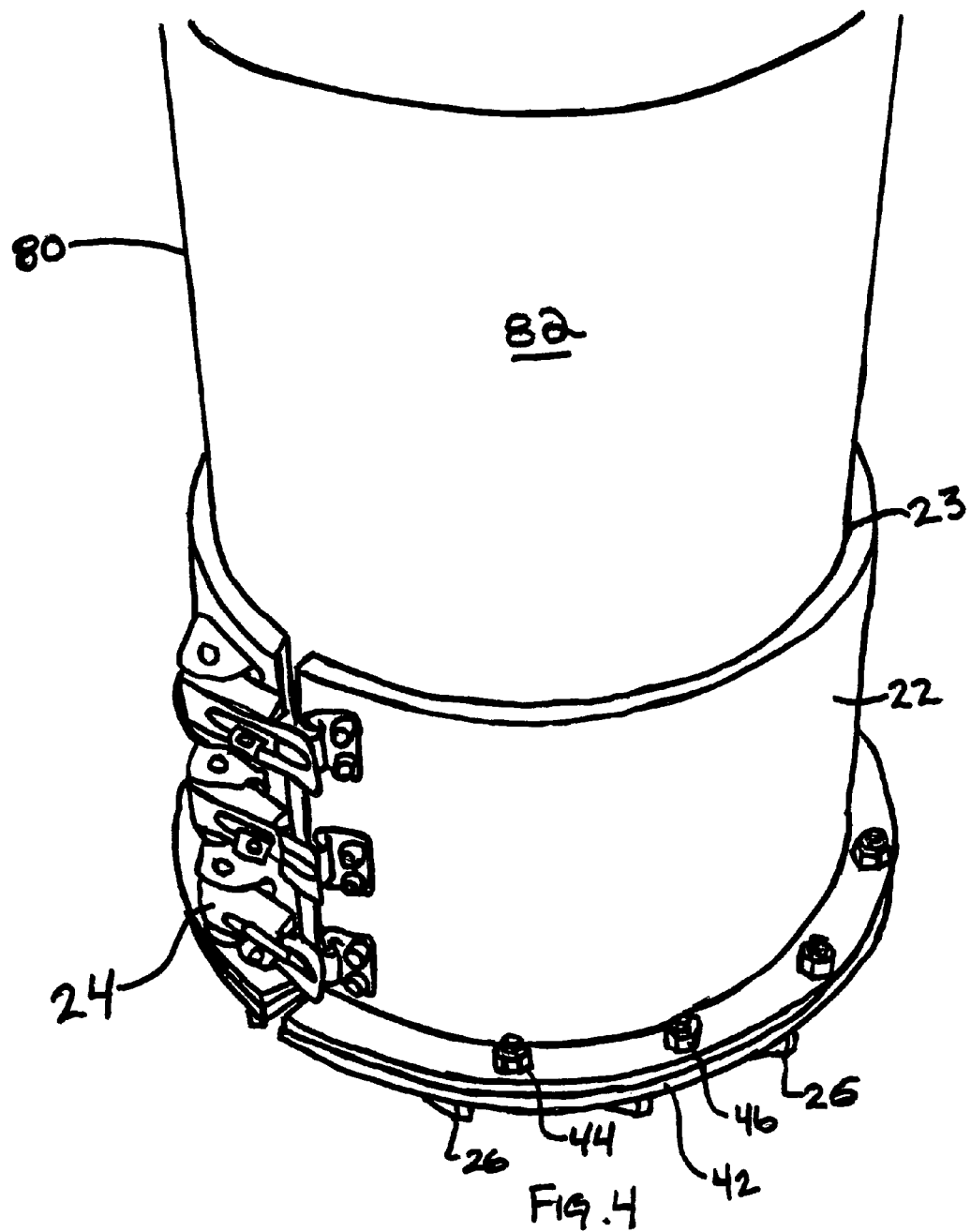
FIG. 4 is a perspective view of the removable countersink bit removably attached to a traditional core bit according to aspects of the present invention.

Referring now to FIG. 4, a removable countersink bit 10 is attached to the primary bit 80. The outer diameter 83 of the primary bit 80 is substantially similar to the inner diameter 23 of the body 20 of the removable countersink bit 10. The removable countersink bit 10 is held in place mainly by the friction created between the inner surface 25 of the body 20 and the outer surface 85 of the primary bit 80. The removable countersink bit 10 and the primary bit 80 can comprise complimentary keys (not shown) or interlocking channels (not shown) to prevent rotation if the primary bit 80 without rotation of the removable countersink bit 10.

The removable countersink bit 10 may be adjusted, as desired, along the length of the body 82 of the primary bit 80. When positioned in the desired location along the primary bit 80, the clamps 24 on the removable countersink bit can be engaged to maintain the position of the removable countersink bit 10 on the primary bit 80. As the primary bit 80 is operated, it cuts into the substrate, and the removable countersink bit 10 operates to create a countersink hole 60 in a substrate 90, such as, for example, a masonry surface or slab.

Figure 5:
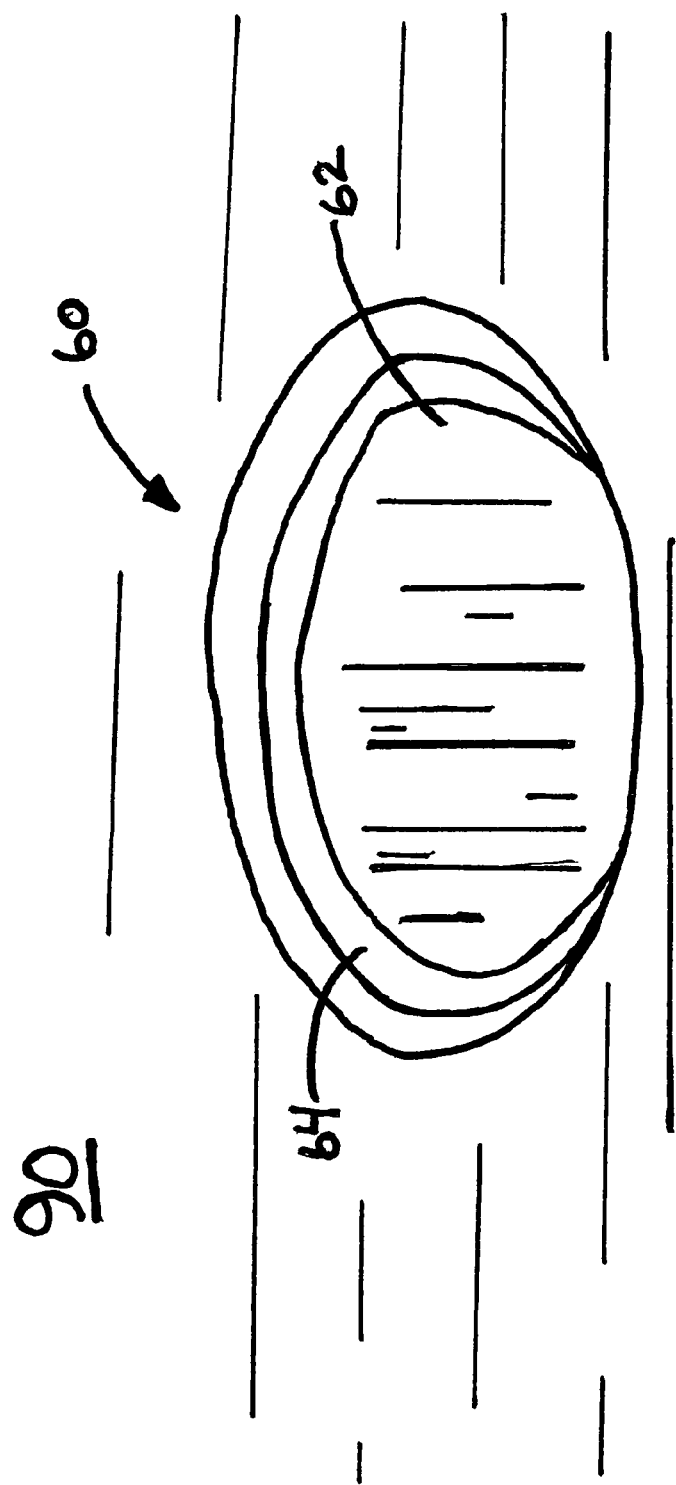
FIG. 5 is a perspective view of a countersink hole according to aspects of the present invention.

Referring next to FIG. 5, a countersink hole 60 is shown illustrating a well hole 62 comprising a stepped countersink hole 64 for receiving a manhole fixture 70. A countersink hole can comprise a stepped hole 64 or a beveled or angled hole (not shown). The method for creating a countersink hole 60, comprises drilling a primary hole 62 with a primary bit 80. Once the primary bit 80 is established in the substrate 90, the removable countersink bit 10 is affixed to the primary bit 80 and drilling resumes. When the desired depth of the countersink hole is achieved, the removable countersink bit 10 can be removed from the primary bit 80, thus allowing the primary bit 80 to continue to be utilized for drilling the primary hole 62. Alternatively, the countersink bit 10 can be attached to the primary bit 80 prior to initiating the drilling of the primary hole 62.

Figure 6:
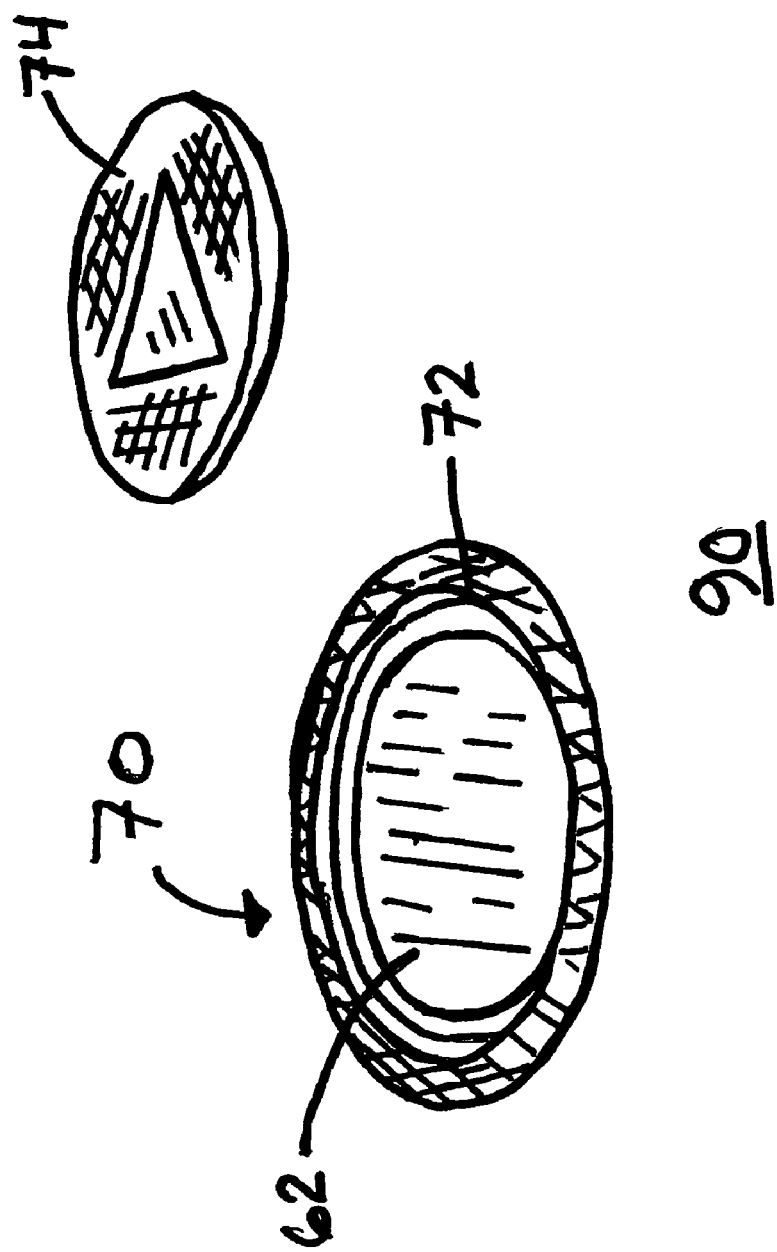
FIG. 6 is a perspective view of an installed manhole fixture in accordance to aspects of the present invention.

Referring next to FIG. 6, upon completion of the drilling of the primary hole 62, a manhole fixture 70 comprising a manhole frame 72 and a manhole cover 74 are placed in the countersink hole 60 to allow the manhole cover 74 to be substantially flush with the surface of the substrate 90. An adhesive such as mortar, grout, glue epoxy, or any other adhesive material (not shown) as is known in the art may be applied to the inner surface of the countersink hole 60 so as to permanently maintain the position of the manhole fixture 70 in the countersink hole 60.

The instant invention allows the immediate use of the manhole cover 74 and eliminates the need to monitor the manhole fixture 70 until the manhole fixture 70 is appropriately affixed to the substrate 90.

The alternate uses for the masonry countersink bit disclosed herein include electrical, plumbing; carpentry, and other construction applications.

Inasmuch as the preceding disclosure presents the best mode devised by the inventor for practicing the invention, it is intended to enable one skilled in the pertinent art to carry it out. It is apparent that structures and methods incorporating modifications and variations will be obvious to those skilled in the art. As such, this disclosure should not be construed to be limited thereby but include such aforementioned obvious variations.

I claim:

1. A countersink bit comprising:
   a substantially cylindrical body having a first end, a second opposite end and at least one longitudinal split traversing the body between said ends;
   at least one clamp attached to the body at the split;
   a flange attached to one end of the body, said flange comprising at least one cutter.

2. The countersink bit of claim 1, wherein said body comprises a second opposite split traversing the body between said ends at a position substantially opposite said longitudinal split.

3. The countersink bit of claim 2 wherein said second split comprises at least one hinge.

4. The countersink bit of claim 1 further comprising a plurality of cutters wherein said cutters are affixed to cutting plates removably attached to said flange.

5. The countersink bit of claim 1 wherein said at least one cutter comprises diamond material.

6. The countersink bit of claim 1 wherein said at least one clamp is selected from the group consisting of a cam clamp, a ring clamp, a band clamp and a toggle latch.

7. The countersink bit of claim 1 wherein said body is made from a material comprising metal.

8. The countersink bit of claim 1 further comprising an inner surface having interlocking channels for receiving opposite interlocking channels on a primary bit.

9. The countersink bit of claim 1 further comprising an inner surface having a channel for receiving a key to prevent countersink bit slippage on a primary bit.

10. A removable masonry countersink bit comprising:
    a substantially cylindrical body having a first end and a second opposite end, wherein said body is defined by two halves further comprising a first split traversing the body between said ends and a second split traversing the body between said ends substantially opposite the first split;
    at least one clamp attached to the body at the first split for connecting each of said halves;
    at least one hinge disposed at the second split and connected to each of said halves;
    at least one flange attached to one end of the body, said flange comprising at least one cutter.

11. The countersink bit of claim 10 further comprising a plurality of cutters wherein said cutters are affixed to cutting plates removably attached to said flange.

12. The countersink bit of claim 10 wherein said at least one cutter comprises diamond material.

13. The countersink bit of claim 10 wherein said at least one clamp is selected from the group consisting of cam clamps, ring clamps, band clamps and toggle latches.

14. The countersink bit of claim 10 wherein said at least one clamp comprises a cam clamps.

15. The countersink bit of claim 10 wherein said at least one clamp comprises a toggle latch.

16. A method of drilling a countersink hole comprising:
    attaching a countersink bit to a primary bit wherein said countersink bit comprises a substantially cylindrical body, at least one longitudinal split traversing the body, at least one clamp attached to the body at the split; and a flange attached to one end of the body, said flange comprising at least one cutter;
    drilling a primary hole with said primary bit; and
    advancing said countersink bit to the substrate and rotating said countersink bit about the primary hole thereby causing said countersink bit to drill a countersink hole in the substrate.

17. The method of claim 16 wherein said countersink bit is rotated until a countersink hole is created having a depth substantially similar to the thickness of a man hole fixture.

18. The method of claim 16 wherein said countersink bit is removed from said primary bit.

19. The method of claim 18 wherein said countersink bit is removed from said primary bit without removing said primary bit from said primary hole.

* * * * *